United States Patent [19]
Hickman et al.

[11] Patent Number: 5,956,486
[45] Date of Patent: Sep. 21, 1999

[54] METHOD AND APPARATUS FOR MONITORING MULTIPLE ELECTRONIC MAIL SYSTEMS

[76] Inventors: Paul Lawrence Hickman, 26500 Purissima Rd., Los Altos Hills, Calif. 94022; Lawrence Keith Stephens, 13730 Beaumont Ave., Saratoga, Calif. 95070

[21] Appl. No.: 08/575,918

[22] Filed: Dec. 20, 1995

[51] Int. Cl.⁶ .......................... G06F 13/366; H04M 11/00
[52] U.S. Cl. ................... 395/200.36; 395/200.54; 395/200.59; 395/200.49; 379/93.24; 379/93.25; 379/92.01; 379/92.04; 379/93.17; 340/825.08; 340/825.54; 340/825.55
[58] Field of Search .................. 364/514 R, 514 A, 364/514 B; 395/200.01, 200.1, 200.12, 200.15, 200.16, 200.2, 200.03, 200.05, 200.57, 200.68, 200.75, 200.8, 200.36, 200.46, 200.47, 200.49, 200.34, 200.37, 182.02; 379/89, 88, 90, 96, 106, 90.01, 106.01, 93.01, 92.01, 93.06, 92.04, 93.24, 93.17, 93.25, 100.05–100.08, 100.11; 358/402, 403; 340/825.08, 825.54–825.55

[56] References Cited

U.S. PATENT DOCUMENTS

| | | | |
|---|---|---|---|
| 4,935,954 | 6/1990 | Thompson et al. | 379/89 |
| 5,333,266 | 7/1994 | Boaz et al. | 395/200.01 |
| 5,341,293 | 8/1994 | Vertelney et al. | 395/792 |
| 5,379,340 | 1/1995 | Overend et al. | 379/93 |
| 5,390,281 | 2/1995 | Luciw et al. | 395/12 |
| 5,396,546 | 3/1995 | Remillard | 379/93.24 |
| 5,406,557 | 4/1995 | Baudoin | 370/407 |
| 5,426,594 | 6/1995 | Wright et al. | 364/514 R |
| 5,434,910 | 7/1995 | Johnson et al. | 379/89 |
| 5,448,698 | 9/1995 | Wilkes | 395/200.01 |
| 5,487,100 | 1/1996 | Kane | 379/57 |
| 5,513,126 | 4/1996 | Harkins et al. | 364/514 A |
| 5,524,201 | 6/1996 | Shwarts et al. | 395/326 |
| 5,544,295 | 8/1996 | Capps | 395/173 |
| 5,555,369 | 9/1996 | Menendez et al. | 395/334 |
| 5,557,736 | 9/1996 | Hirosawa et al. | 395/182.02 |
| 5,579,472 | 11/1996 | Keyworth, II et al. | 395/326 |

OTHER PUBLICATIONS

"Using FlashSessions," America Online, Apr. 10, 1996, pp. 1–5.

"Getting Started," Mail*Link Remote for QuickMail™, Chapter I, StarNine Technologies, Inc., StarNine Technologies 1991–1994, pp. 5–6.

*Primary Examiner*—James P. Trammell
*Assistant Examiner*—Tuan Q. Dam

[57] ABSTRACT

A method for monitoring multiple electronic mail systems includes the steps of: a) configuring an e-mail system polling process on a user's machine; b) polling a number of e-mail systems from the user's machine; c) retrieving data from the e-mail systems concerning mail intended for the user; and d) storing the data on the user's machine in a format that permits the storage and retrieval of data pertaining to the plurality of e-mail systems. The polling can be accomplished in the background while the user is performing other tasks on the computer system. An apparatus for monitoring multiple electronic mail systems includes a digital processor, read/write memory coupled to the digital processor, and at least one external communication channel coupled to the digital processor permitting the digital processor to communicate with a plurality of external electronic mail systems. A poller of the apparatus is operative to generate inquiries over the communication channel to the plurality of electronic mail systems, a data retriever is operative to receive data concerning mail intended for a designated user, and a data handler is operative to store and retrieve data concerning the mail for the designated user. An article of manufacture of the present invention includes the poller, data retriever, and data handler stored in a machine-readable storage medium.

22 Claims, 13 Drawing Sheets

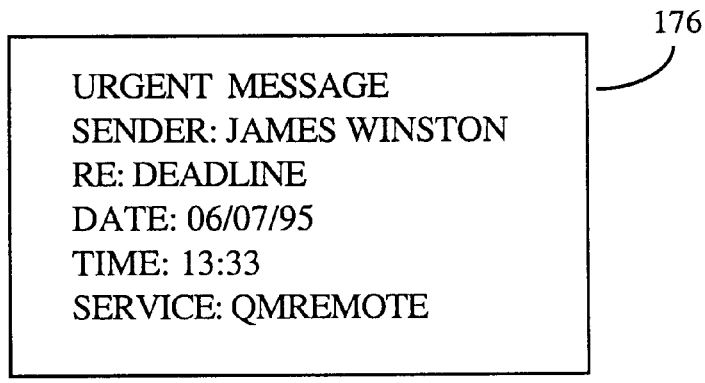
FIGURE 11
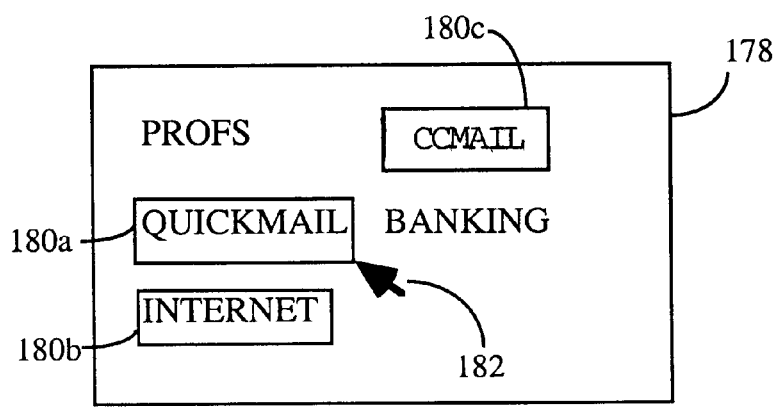
FIGURE 12a
FIGURE 12b

METHOD AND APPARATUS FOR MONITORING MULTIPLE ELECTRONIC MAIL SYSTEMS

BACKGROUND OF THE INVENTION

This invention relates generally to electronic mail systems, and more particularly to electronic mail systems implemented with personal computers.

Personal computers were originally designed as stand-alone, desktop systems. As such, single users used their personal computers to run application programs such as word processors, spreadsheets, database managers, etc. Communications between a personal computer and other computer systems was largely limited to the physical transfer of data stored on a magnetic medium, such as a floppy disk or magnetic tape.

As personal computers became more widespread, there was an increasing demand for direct data communication between two or more computers. The use of modems to allow inter-computer communications became common. In addition, there was a rapid development of personal computer network technology during the 1980's.

As the number of direct communication channels between personal computers increased, electronic mail systems proliferated. With an electronic mail ("e-mail") system, a computer user can create a message in the form of electronic "mail" and can send it using another user's electronic "address". Recipients of e-mail can retrieve their electronic mail from their electronic "mailboxes" and, if desired, respond to or forward the message to other users.

E-mail systems tend to work quite smoothly if only a single mail system is used on a particular personal computer. However, things begin to get more complicated if the personal computer system supports a number of e-mail systems. For example, a personal computer can be coupled to a local area network (LAN), a wide area network (WAN), a mainframe computer, and to other computerized systems over telephone lines via modems. In such situations, multiple e-mail systems are likely to be available which requires users to periodically manually check each of their e-mail systems to see if they have any messages.

As an example, users might subscribe to multiple e-mail systems, such as America On Line (AOL), CompuServe, the Internet, on-line banking services, etc. Any one or more of these e-mail systems might be holding mail for a user at a particular time. Therefore, users must remember to check each of these e-mail systems on a periodic basis to determine of they have any mail. This can be a time consuming task if the user is a subscriber to a number of mail systems. Furthermore, if users forget to periodically check for mail with each of their services, it is possible that important mail may remain unread for a long period of time. This can be especially problematical if the sender of the e-mail erroneously assumes that the user frequently checks their mail box and, therefore, has received and acted on the e-mail.

There are some e-mail systems which permit the automatic retrieval of messages or mail. For example, software provided by America On Line can be configured to cause a personal computer system to automatically connect (via modem) with AOL computers on a periodic basis to check for mail. Also, StarNine Technology, Inc. of Berkeley, Calif. provides software called MaiLink Remote™ for Quick-Mail™ which works with QuickMail e-mail software made by CE Software of West Des Moines, Iowa to periodically dial-in (via modem) to the Internet to check for Internet e-mail. The Internet e-mail can then be delivered to individual users via the QuickMail e-mail system.

The prior art systems for automatically checking for e-mail suffer from a variety of drawbacks. For one, the software (referred to herein as "accessor" software) is typically custom-designed for each e-mail system. This tends to be expensive and inflexible. Also, prior art systems do not provide a method or apparatus for monitoring multiple e-mail systems, and for collecting, storing, and displaying e-mail information concerning the multiple systems in a consolidated and usable fashion. Because of these limitations, users have heretofore been forced to either manually check each E-Mail system on a periodic basis, or been subjected to multiple, independent, inconsistent, and possibly conflicting automated retrieval systems.

SUMMARY OF THE INVENTION

The present invention provides a method and apparatus for effectively monitoring multiple e-mail systems and for alerting users when they have received e-mail at any one or more of the multiple systems. The invention does not require modification of the accessor software for a particular e-mail system, and can provide either background or manual polling of all or selected subset of e-mail systems that are accessible by a given personal computer system. In addition, images, text, and e-mail attachments can be automatically downloaded to a user's personal computer for later use.

A method for monitoring multiple e-mail systems in accordance with the present invention begins with configuring an e-mail system polling process on a user's machine, e.g. a personal computer. Next, a number of e-mail systems are polled from the user's machine over appropriate communication channels. These communication channels often include a modem and a telephone line connection ("telephone system"). With a telephone system communication channel, the polling is accomplished by dialing the access telephone number of the e-mail system using the modem, and then sending inquiries to the e-mail system over the telephone lines. Next, data is retrieved from the e-mail systems concerning the mail intended for the user. This data can include a "null" indicating that there are no messages for the user, or it can include data indicating that there are one or more messages for the user. Further, an image of the e-mail message, the text of the message, or any attachment to the e-mail can be downloaded to the personal computer system as data. Finally, the method includes a step of storing the downloaded data on the user's machine in the format that permits the convenient and efficient storage and retrieval of data pertaining to a number of e-mail systems.

An apparatus for monitoring multiple electronic mail systems includes a digital processor, read/write memory coupled to the digital processor, and at least one external communication channel coupled to the digital processor to permit the digital processor to communicate with a plurality of e-mail systems. The apparatus further includes a poller which generates inquiries over the communication channel, a data retriever which retrieves data concerning mail intended for a designated user, and a data handler stores and retrieves data concerning mail for the designated user. A number of external communication channels can be used with the present invention, including a local area network (LAN), a modem/telephone line system, and terminal emulators for coupling the digital processor to a larger computer system.

An article of manufacture for monitoring multiple electronic mail systems includes a machine-readable storage medium, a poller stored in the storage medium and including program instructions to generate inquiries over at least one communication channel to a number of e-mail systems, a data retriever stored in the storage medium including program instructions to receive data concerning e-mail intended for a designated user from the plurality of e-mail systems, and a data handler stored in the storage medium and including program instructions to store and retrieve the data concerning mail for the designated user from the plurality of electronic mail systems. The article of manufacture further includes a controller stored in the storage medium and including program instructions to control the operation of the poller, the data retriever, and the data handler. In addition, the article of manufacture preferably includes an inputter stored in the storage medium including program instructions which allows user inputs to the controller, and a displayer stored in the storage medium including program instructions which allows the selective display data stored by the data handler.

The present invention also includes an e-mail database structure stored in machine-readable memory including a plurality of mail headers corresponding to a plurality of e-mail systems that are being monitored for messages for a designated user, and a message block corresponding to each detected message for the designated user from the plurality of e-mail systems, where each message block is linked with an e-mail header. Preferably, each of the plurality of mail headers include information concerning the number of messages with which it is linked. Also preferably, each of the message blocks includes a message identification code associated with the message block and its mail header. Each of the message blocks can further include information concerning the message and pointers to data reflecting a content of the message. The content can include, for example, images of the message, the text of the message, and attachments to the message.

These and other advantages of the present invention will become apparent to those skilled in the art upon a reading of the following descriptions of the invention and a study of the several figures of the drawing.

BRIEF DESCRIPTION OF THE DRAWINGS

FIG. 4b illustrates an interactive dialogue window called from the screen shown in FIG. 4a;

FIG. 11 is a dialog box further illustrating the "DISPLAY DATA" step of FIG. 3; and FIGS. 12a, 12b, and 12c further illustrate an embodiment of the "DISPLAY DATA" step of FIG. 3.

DETAILED DESCRIPTION OF THE PREFERRED EMBODIMENTS

Figure 1:
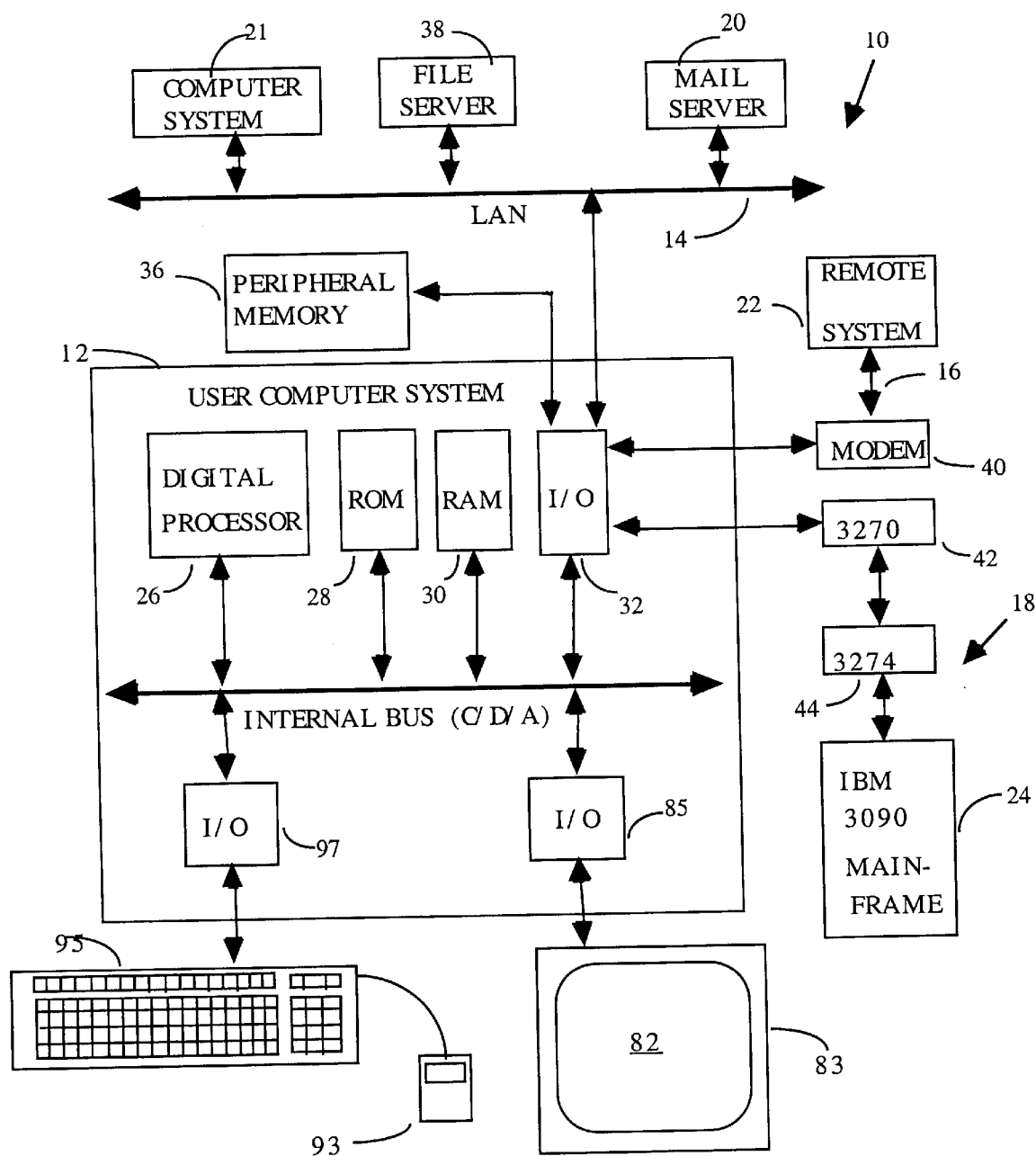
FIG. 1 is a block diagram of a communication system including multiple e-mail systems and an apparatus for monitoring the multiple e-mail systems.

In FIG. 1, a communication system 10 in accordance with the present invention includes a "local" or "user" computer system 12 and one or more communication channels such as a local area network (LAN) 14, a telephone line 16, and a main-frame computer link 18. The computer system 12 can communicate by electronic mail (e-mail) with a number of remote systems, including a mail server 20, one or more "other" computer systems 21, a remote system 22, a main-frame 24, and a file server 38. The present invention manages and enhances the handling of multiple e-mail sources over one or more communication channels.

A computer system 12 of the present invention is preferably a personal computer or workstation available from a variety of vendors. More particularly, computer system 12 is preferably a Macintosh™ computer system available from Apple Computer, Inc. of Cupertino, Calif. However, computer system 12 can also be an IBM/PC-AT compatible personal computer running, for example, DOS or Windows™ operating systems, such systems being available from Microsoft, Inc., of Redmond, Wash. Still further, computer system 12 can be a custom computer system designed primarily for communication with multiple e-mail servers over one or more communication channels.

Computer system 12 includes a digital processor 26 (sometimes called a central processing unit or "CPU"), read-only memory (ROM) 28, random access memory (RAM) 30, and input/output (I/O) circuitry 32. The computer system 12 includes an internal bus 34 including appropriate control (C), data (D), and address (A) busses. The digital processor 26, ROM 28, RAM 30, and I/O 32 are coupled (directly or indirectly) to the internal bus 34 to provide internal communications between the system components. The design and manufacture of computer systems such as computer system 12 is well known to those skilled in the art.

As indicated previously, the computer system 12 is preferably a Macintosh™ computer system. The digital processor 26 is therefore either preferably a Motorola 68XXX Microprocessor or a Power-PC Microprocessor, also available from Motorola, Inc. ROM 28 includes the basic start-up instructions for the computer system 12 and also includes a substantial portion of the computer operating system. RAM 30 is used as "scratch-pad" memory to temporarily hold data and application programs executing on digital processor 26. I/O 32 includes latches, buffers, registers, etc. which facilitate the communication of computer system 12 with external devices and systems.

Computer system 12 is preferably associated with peripheral memory 36. As used herein, "peripheral memory" will refer to "secondary" or "non-primary" memory. Primary memory such as RAM 30 is used more for the immediate storage needs of the processor 26, while the peripheral memory is typically used for longer term (and less frequently used) storage. Primary memory tends to be volatile (i.e. the memory is lost when power is removed), while peripheral memory tends to be non-volatile. The peripheral memory can be coupled to the computer system 12 through I/O 32 or, in some instances, is directly coupled to the internal bus 34. Examples of peripheral memory include hard disk drive units, floppy disk drive units, and PCMCIA memory units. The peripheral memory 36 is therefore generically represented as one or more of these peripheral memory types.

Each of the peripheral memory types described above include computer-readable media. For example, the hard disk of a hard disk drive peripheral memory 36 can store data and software instructions in a magnetic media. Likewise, CD-ROM or floppy disk peripheral memory 36 can store data and software instructions in machine-readable form. The same is true for PCMCIA memory which stores machine-readable data and software instructions in a form of "flash" memory.

The communication system 10 can also include an external communication channel such as a local area network (LAN) 14. The LAN 14 is often (but not necessarily) managed by a file server 38. A mail server 20 is often provided to manage e-mail communications among a number of computer systems (such as computer systems 12 and 21) coupled to the local area network 14. The mail server 20 is typically a personal computer system is provided with specialized e-mail software. This e-mail software can also be run on file server 38, or may be distributed throughout the system on user personal computers (such as computer systems 12 and 21) in a peer-to-peer system. However, as it is presently implemented, a mail server 20 is preferably a stand-alone system or is a part of the file server 38.

The computer system 12 also has the capability of sending and receiving e-mail to a number of remote systems 22. For example, the computer system 12 can communicate with a commercial service such as America On-Line (AOL), communicate through the Internet, or communicate with an On-Line Banking system. These communication links are typically accomplished through a modem 40 over a standard analog telephone line 16. However, it is also possible to communicate directly digitally with a number of systems, such as over a digital ISDN line. In such an instance, a modem 40 will not be required but, rather, and ISDN bridge or the like would likely be required.

To communicate with a remote system 22, the computer system 12 instructs the modem 40 to dial an access number to the remote system 22. A telephone connection is then made over telephone line 16. Of course, as used herein, "telephone line" includes any transmission media used by a telephone service provider including microwave, fiber optic, wire and satellite links. The computer system 12 and remote system 22 can then communicate e-mail messages over this telephone line connection.

Computer system 12 can also communicate with other sources of e-mail. For example, mainframe computer systems 24 are often used as central servers for personal computers and computer terminals. For example, the IBM 3090 mainframe is often used for such a purpose. In order to connect the computer system 12 to a mainframe 24, a terminal emulator 42 (such as the 3270 emulator) and interfacer 44 (such as a 3274 interfacer) can be used, as it is well known to those skilled in the art.

As will be appreciated from a study of FIG. 1, the computer system 12 can receive e-mail from a variety of sources. For example, the computer system 12 can receive e-mail from mail server 20, a number of remote systems 22, from a mainframe system 24, from the file server 38, and from a number of other computer systems (e.g. computer system 21) coupled to LAN 14. As will be described subsequently, the present invention includes specialized software for managing and controlling e-mail from multiple remote sources. However, it should be noted that some or all of the processes described herein can be implemented in software, firmware, hardware, and any combination of software, firmware, and hardware.

Figure 2:
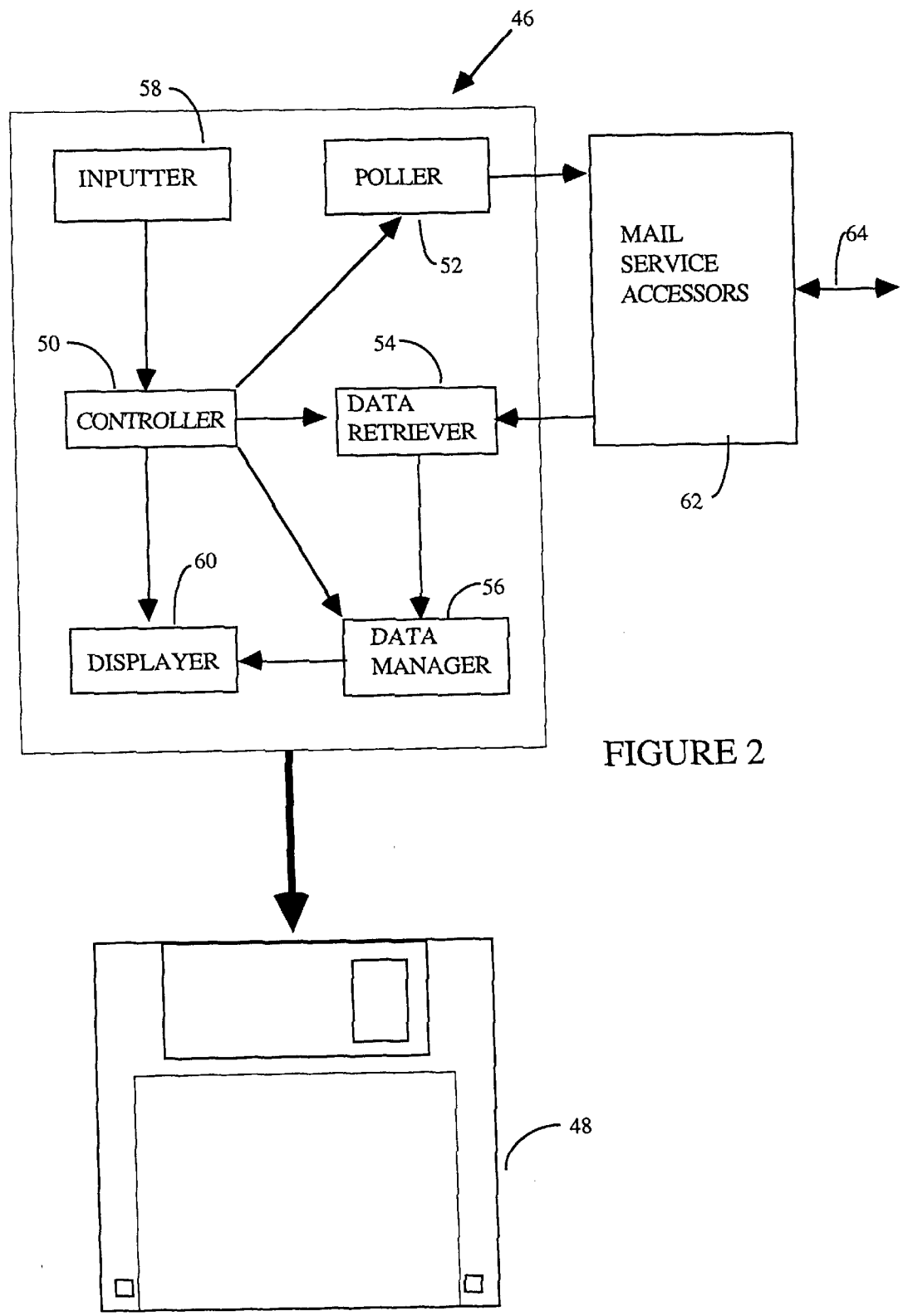
FIG. 2 is a block diagram of an apparatus for monitoring multiple e-mail systems.

FIG. 2 illustrates a communication system 46 in accordance with the present invention. As noted above, the communication system 46 can be implemented in software in a compute-readable media such as RAM 30, and can be provided to end users on computer-readable media such as a floppy disk 48 or a CD-ROM (not shown). When a communication system 46 is stored on floppy disk 48, an article of manufacture is created which can be used to configure computer system 12 to perform the communication management processes of the present invention.

The communication system 46 includes a controller 50, a poller 52, a data retriever 54, a data manager 56, an inputter 58, and a displayer 60. The controller 50 provides overall control of the process implemented by the communication system 46. A poller 52 interacts with one or more mail system accessors 62 to communicate over a communication channel 64 with one or more remote e-mail systems. The mail system accessors 62 are typically provided by the e-mail remote service provider. For example, America On-Line (AOL) will provide an AOL mail system accessor, Wells Fargo Bank will provide a Well Fargo On-Line service accessor for on-line banking, etc. Data retrieved from a remote e-mail system is passed by the mail system accessor 62 to data retriever 54. This data is passed to data manager 56 for storage in an appropriate data structure to be discussed subsequently. The data manager 56 can interact with a displayer 60 to display information concerning about the received data on a screen 12. The inputter 58 (typically a keyboard or mouse) of computer system 12 allows user inputs to controller 50.

As noted above, in the present invention it is preferred to use the mail system accessors 62 provided by the e-mail system. However, the functionality of the mail system accessors can be directly integrated into the communication system 46 of the present invention. While this requires the development of accessor drivers for each desired e-mail system, it has the advantage of being more closely integrated with the functionality of the communication system 46. Therefore, in an embodiment of the present invention, some or all of the functionality of the mail system accessor 62 may be provided with communication system 46 and delivered on a computer-readable medium such as floppy disk 48. Implementation of such "accessors" or "drivers" is well known to those skilled in the art.

Figure 3:
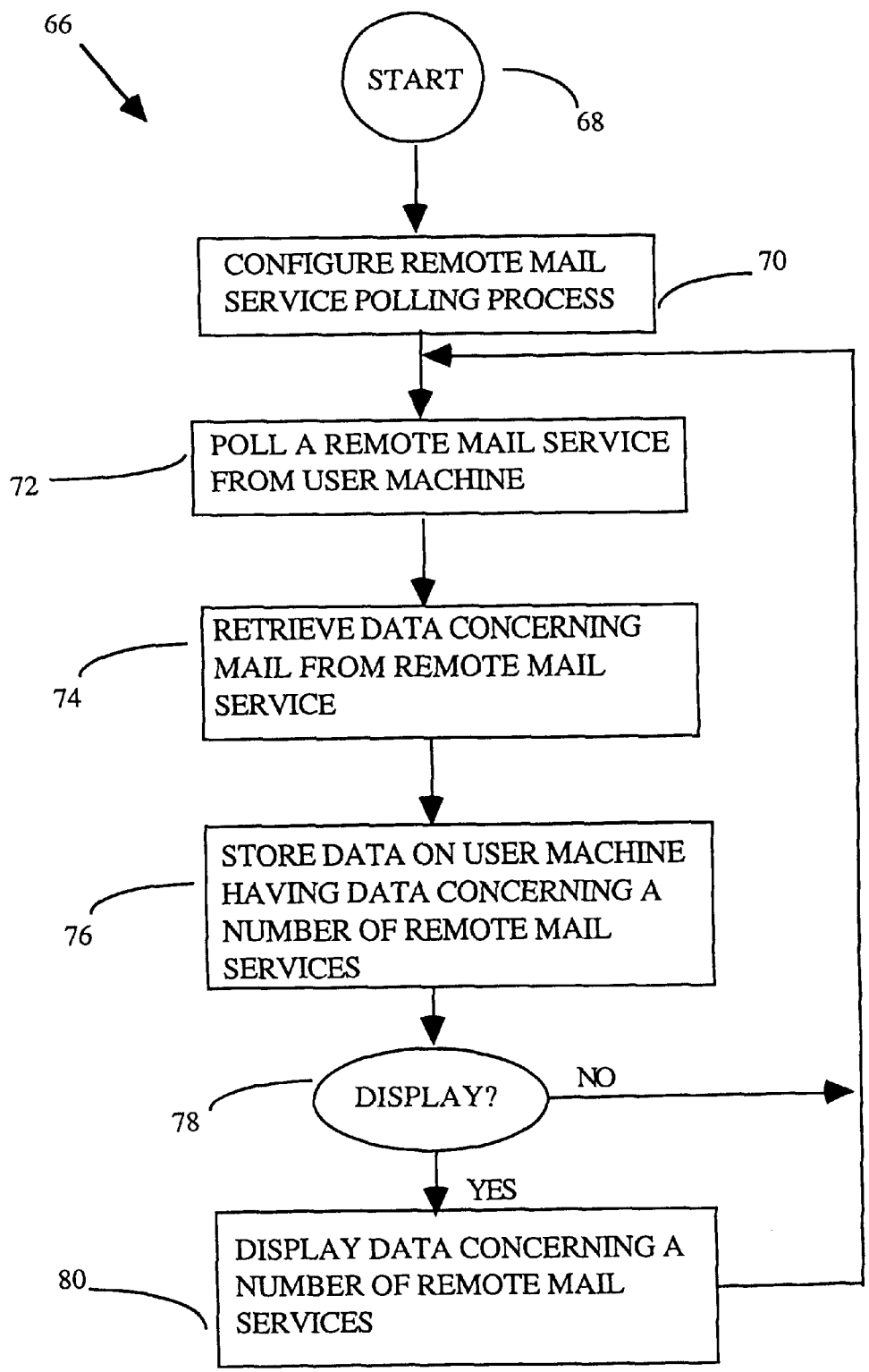
FIG. 3 is a flow-diagram of a method for monitoring multiple e-mail systems in accordance with the present invention.

In FIG. 3, a process 66 for monitoring multiple electronic mail systems is illustrated. The process 66 begins at 68 and, in a step 70, the e-mail system polling process is configured. Next, in a step 72, an e-mail system is "polled" from a user machine. As used herein, a "poll" refers to the connection to an e-mail system at the initiation of the user's machine and the subsequent inquiry to the remote e-mail system concerning e-mail for the user. The verb "polling" refers to the act of making a "poll". Next, in a step 74, data concerning e-mail is received from the remote e-mail system. This, data can be the e-mail itself or it can be the existence or non-existence of the e-mail on the remote e-mail system. Next, in a step 76, data is stored on the user machine in a format which permits the storage of information concerning a number of remote e-mail systems. In a step 78, it is determined whether information concerning e-mail is said to be displayed on the screen of the computer system 12. If not, process control is returned to step 72. If information is to be displayed, it is displayed in step 80 in a format which permits information concerning a number of remote e-mail systems to be displayed simultaneously.

Figure 4A:
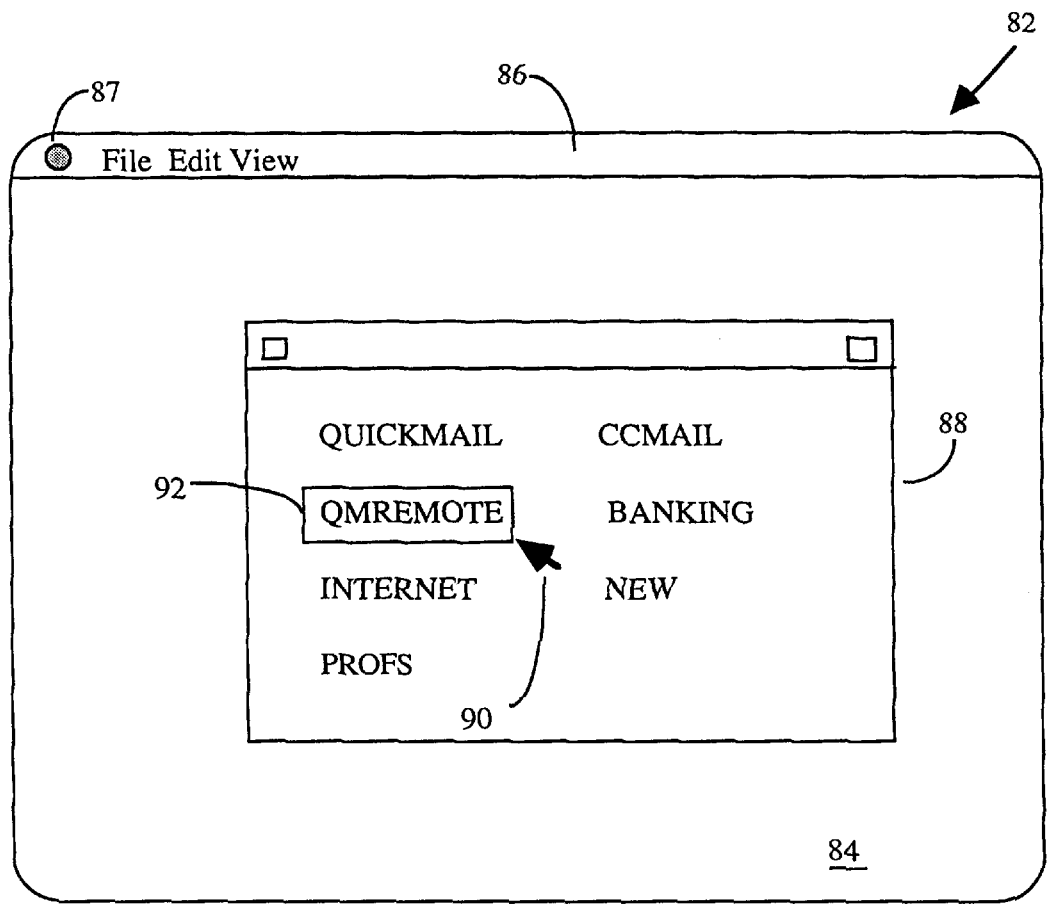
FIG. 4a is a view of a computer screen which helps illustrate the "CONFIGURE E-MAIL SYSTEM POLLING PROCESS" step of FIG. 3.

In FIGS. 1 and 4a, a screen 82 of a display 83 coupled to the internal bus 34 of computer system 12 by a video I/O interface 85 is illustrated. The screen 82 includes a "desktop" 84, a command bar 86, and a window 88. Screen similar to the illustrated screen 82 can be provided by Macintosh™ computer systems.

Figure 4B:
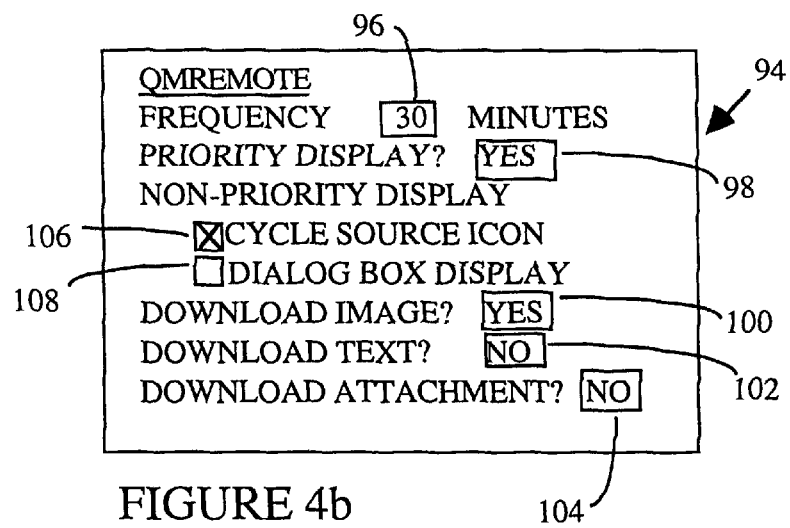

The "CONFIGURE E-MAIL SYSTEM POLLING PROCESS" step 70 of FIG. 3 will be described with reference to both FIGS. 4a and 4b. In FIG. 4a, a pointer 90 is pointing to ("selecting") an e-mail system "QMREMOTE" as indicated by the selection box 92. After the service QMREMOTE has been selected (such as by "double clicking" the button of a mouse 93 coupled to internal bus 34 via a keyboard 95 and a keyboard I/O interface 97 in FIG. 1) a window 94 as illustrated in FIG. 4b will appear on desktop 84. The window 94 includes a number of fill-in and check-off boxes. For example, the window 94 includes fill-in boxes 96, 98, 100, 102, and 104. Window 94 also includes check-off boxes 106 and 108. The fill-in box 96 permits a user to enter or "input" the frequency of the polling to be provided by the system of the present invention. In this instance, the frequency is set for 30 minutes. That is, every 30 minutes, the poller 52 will access the e-mail system QM Remote, form a communications link, and poll the e-mail system. Fill-in box 98 indicates whether a priority display is to be provided. For non-priority displays, the check-off boxes 106 and 108 indicate whether the source icon is to be cycled or a dialogue box is to be displayed, or both. Fill-in box 100 indicates whether an image of an e-mail should be downloaded to the user's computer system 12. Fill-in box 102 indicates whether text should be downloaded to the user's computer system 12. Finally, fill-in box 104 indicates whether an attachment should be downloaded to the user's e-mail system 12.

Figure 5:
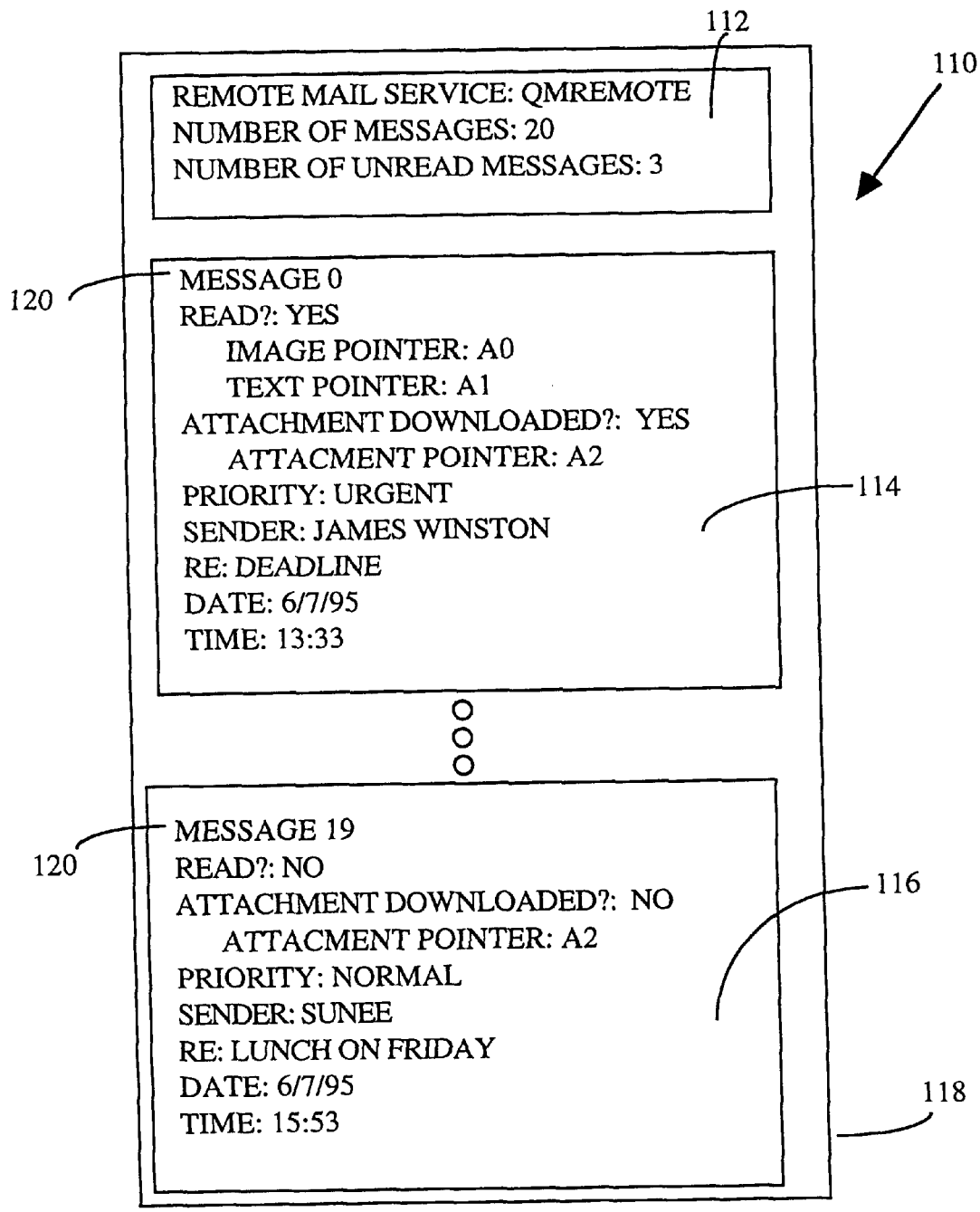
FIG. 5 illustrates a data structure of the present invention.

FIG. 5 illustrates a data structure 110 in accordance with the present invention. This data structure can be stored in any machine-readable medium such as in RAM 30 or in peripheral memory 36. The data structure 110 includes a header 112 and a number of message blocks, such as message blocks 114 and 116. Each of the message blocks (such as message blocks 114 and 116) that are associated with the e-mail system of the header 112 are linked to the header 112. This linking is illustrated graphically by the box 118. As it should be noted that the illustration of FIG. 5 is a logical, and not necessarily physical, construct and the various data can be stored in various locations in memory that are not necessarily contiguous with each other. However, as it is well known to those skilled in the art of data management, pointers and links can be used to provide the functionality described herein even though the data may be distributed in various locations and memory.

The header 112 includes the identification of the remote e-mail system, which in this instance, is QMREMOTE. In addition, the header 112 may include the total number of messages on that remote e-mail system, and a number of unread messages on that remote e-mail system. Other information may be included in the header 112 to provide data concerning the particular remote service which helps in the management of the message blocks for that remote service.

The message blocks 114 and 116 are similar in structure, although they contain different data. In message block 114, a message ID 120 number "0" is provided so that it can be differentiated from other message blocks. Next, it is indicated whether the message "0" has been read. Since it has, in this instance, an image pointer and a text pointer are provided. The image pointer points to an address A0 where the image of the e-mail is stored in memory. The text pointer points to an address A1 where the text of the message is stored.

The message block 114 also indicates that an e-mail "attachment" has been downloaded. As it is well known in the art of providing e-mail systems, and "attachment" is a file, document, image or other datum that accompanies a given e-mail message. Since in this instance it is indicated that an attachment has been downloaded, an attachment pointer A2 points to the location in memory where the attachment has been stored. Next, the priority is indicated to be urgent and the sender is indicated to be James Winston. The message regards a deadline and was sent at Jun. 7, 1995, at 13:33 in the afternoon.

Message block 116 includes a message ID 120 of "19", and indicates that the e-mail for message #19 has not yet been read. Further, it indicates that the attachment has not been downloaded. The priority of the e-mail is "normal" and the sender is "Sunee". The message regards "Lunch on Friday" and was sent on Jun. 7, 1995, at 15:53 in the afternoon.

It should be noted that the data structure 110 is associated with the e-mail system QM Remote. A similar data structure will be provided for each of the other e-mail remote services supported by the system. For example, America On-Line (AOL) will have its own data structure similar to data structure 110. Such multiple data structures can be managed by a number of data management procedures, as will be appreciated in those skilled in the art. Alternatively, the data structures for the various e-mail remote services can be merged into a single, integrated data structure, as will be appreciated by those skilled in the art of database management.

It will also be appreciated that other data structures can be utilized in the present invention. For example, each message block can incorporate some or all of the data of the header, thereby eliminating the need for the header 112. However, such data blocks would integrate the functionality of the header 112, rendering such a structure substantially equivalent.

Figure 6:
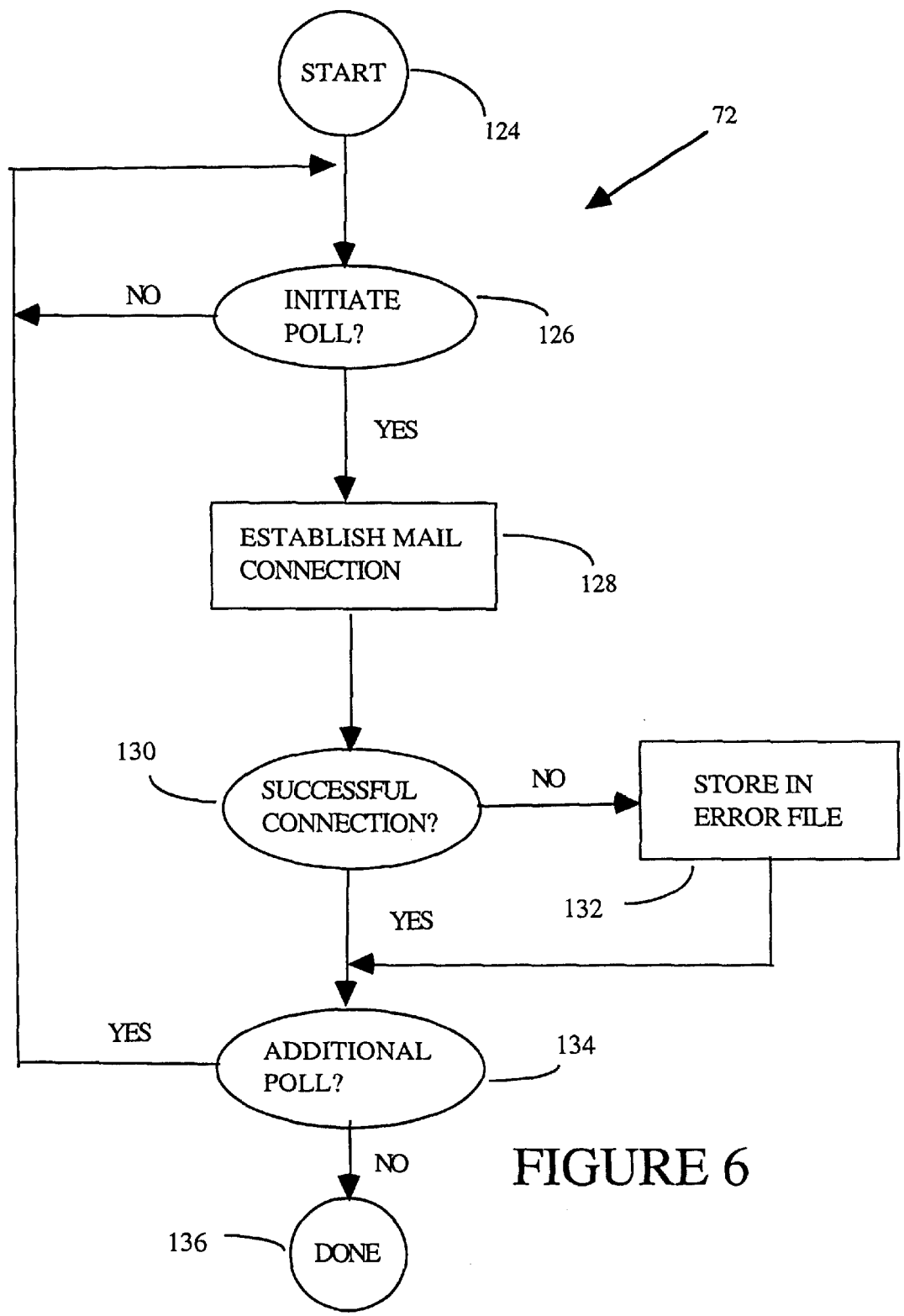
FIG. 6 is a flow-diagram illustrating the "POLL AN E-MAIL SYSTEM FROM USER MACHINE" step of FIG. 3.

FIG. 6 illustrates the "POLL A REMOTE E-MAIL SYSTEM FROM A USER MACHINE" step 72 of FIG. 3 in greater detail. The process of the 72 begins at 124 and, in a step 126, it is determined whether a poll should be initiated. This determination in step 126 can be manual, e.g. a user indicates that a poll should be initiated or it can be automatic, e.g. the computer initiates the poll at regular time intervals or upon the detection that certain conditions have been met. In the case of automatic polling, the frequency of polling indicated in box 96 of FIG. 4b can be used. Alternatively, if certain conditions have been met, such as the power-up of the system, the log-in of a new user, or the exiting from computational or memory intensive user applications, the poll can be automatically initiated.

If a poll is not to be initiated, the process 72 goes into an idle loop. Of course, other processes may be occurring concurrently. If a poll is to be initiated, the mail connection is established in step 128. As described previously, this is preferably accomplished through a mail system accessor such as a mail system accessor 62 of FIG. 2. Next, in a step 130, it is determined whether the connection was successful.

If not, data is stored in an error file in a step 132. Next, in a step 134, is determined whether there should be an additional poll. Reasons for an additional poll can include an unsuccessful connection, or an additional e-mail system on the same communication link. If no additional polling is to be done, the process 72 is complete as indicated by step 136.

Figure 7A:
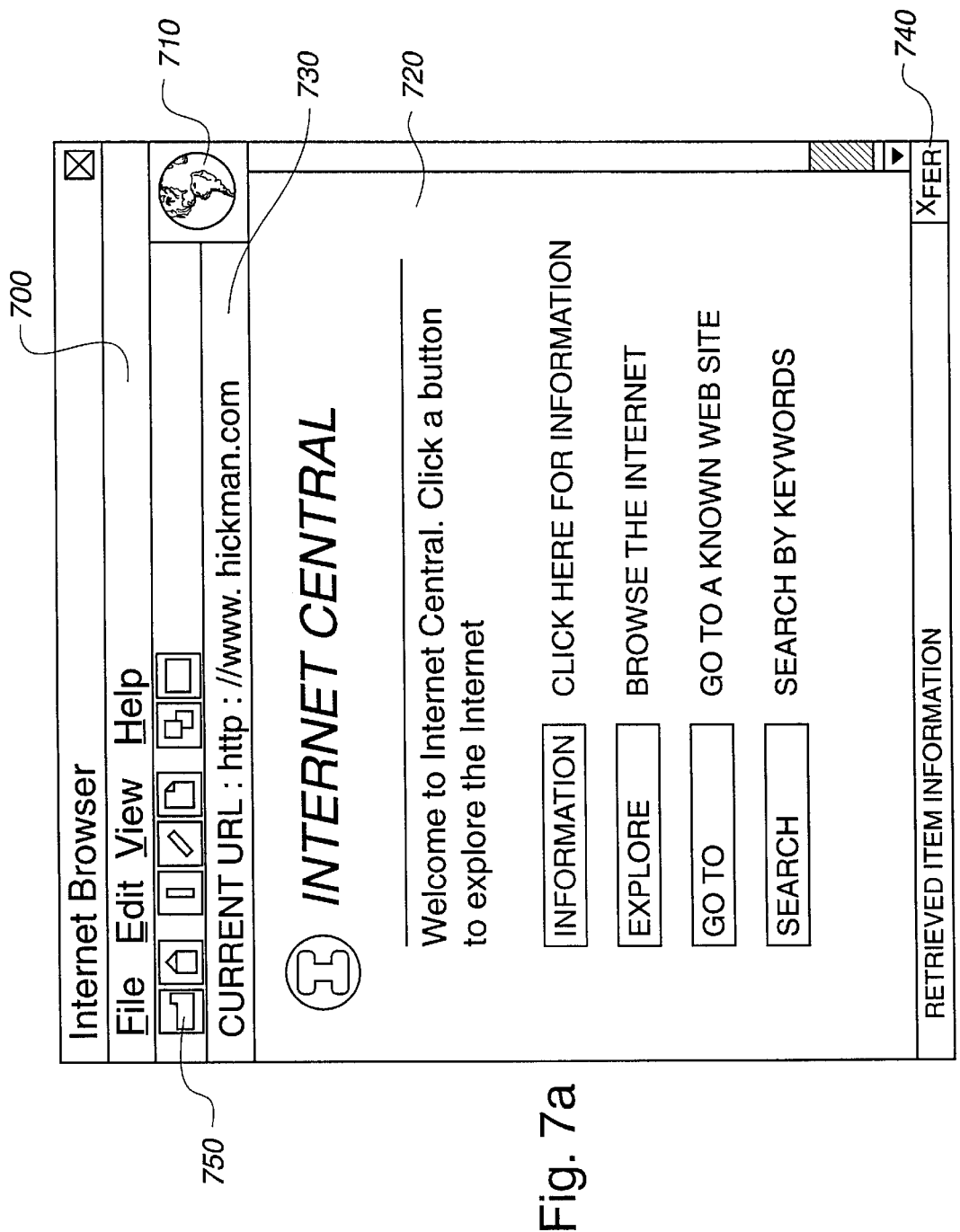
FIGS. 7a and 7b are examples of connection session display screens for establishing and controlling an Internet connection in accordance with a preferred embodiment.
Figure 7B:
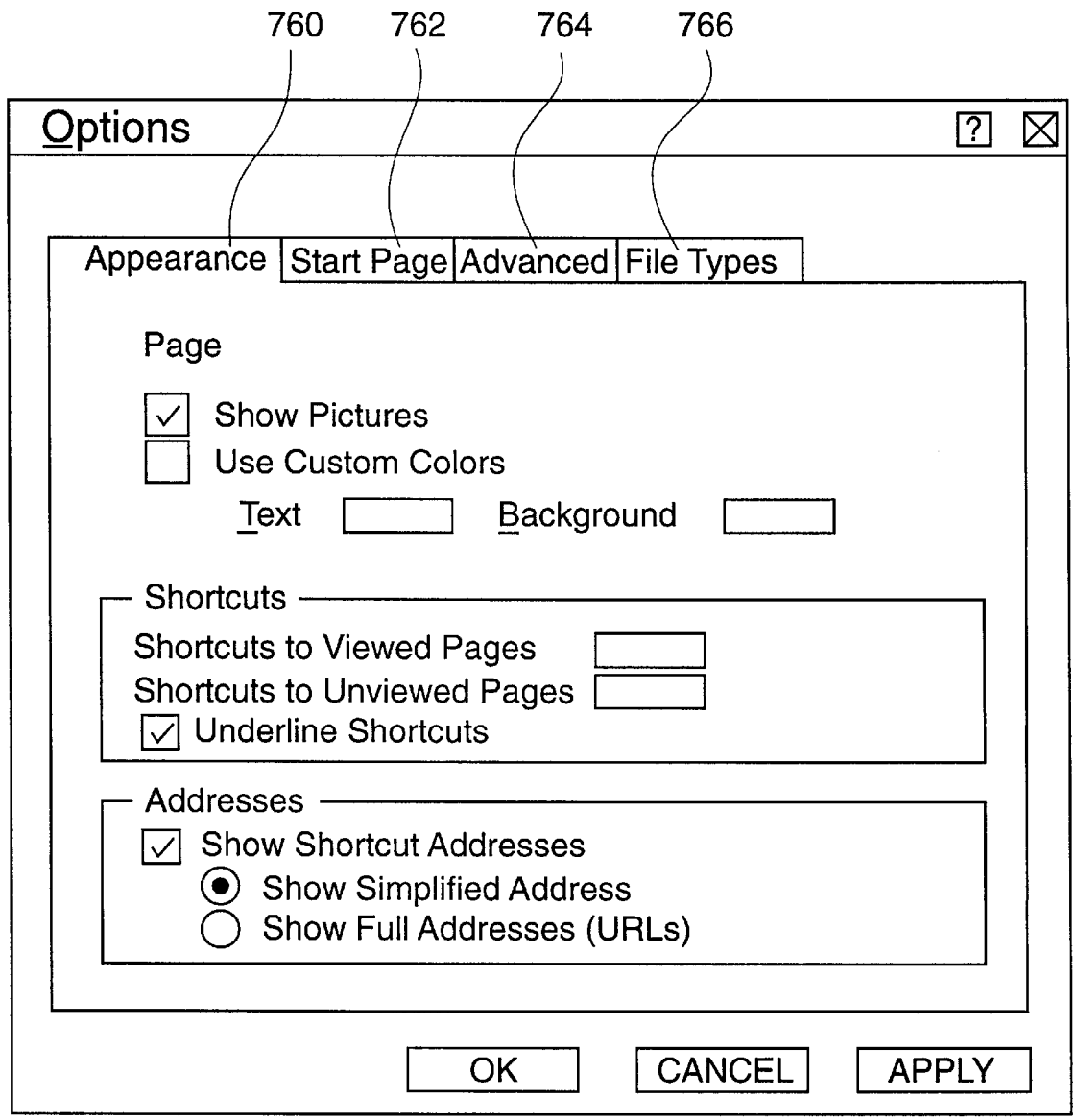

An example of the establishment of an e-mail connection to the Internet is illustrated in FIGS. 7a and 7b. The Internet has become an increasingly popular vehicle for electronic communication and information transfer. An example of an access method display is presented in FIG. 7a. This display is entered traditionally by double-clicking on an icon associated with a windows session on a personal computer. The toolbar 700 facilitates rapid access to most important commands. The commands on the toolbar can also be typically accessed with the menus on the menu bar. The address bar 730 displays the Internet address (URL) of the World Wide Web page a user is currently viewing. In this instance, the page has an address (URL) of http://www.hickman.com. If the page is located on a local computer, the full path to the page is displayed. The address bar can also be utilized for navigation by typing the address of a page that is of interest to a user. The globe animation 710 revolves in an animated fashion on the display when information transfer is in process from a remote computer on the Internet. The status bar 740 interactively presents information on what is currently happening. The icon at the far right of the bar shows detailed information when the pointer is positioned over it. As data is being retrieved, the detailed information also appears at the status bar's left end. The document display area 720 displays the World Wide Web page currently active in the display area. Any items that are highlighted are links (e.g. "Information", "Explore", "Go To", and "Search"), and clicking on them transfers control to the page of information associated with the link area.

When a particular World Wide Web site is accessed, the information associated with the area is placed in a cache, a set of files stored on the user's computer. When a link is selected, the cache is initially queried to determine if the page of interest is located in the cache. If it is, then the page is loaded from the cache instead of transferring the information from the Internet. This greatly increases the speed of operation of the browser. If the page is not found in the cache, then a connection is attempted with the Internet utilizing a modem and autodialer software or through a Local Area Network (LAN) access if a link exists on a local network.

A preferred embodiment utilizes the Setting Options display shown in FIG. 7b to customize features to suit a user's particular preferences and access the Internet through a common interface. From the Select Options display, many of the Internet's features can be selected in accordance with a user's preferences. For example, the Appearance tab 760 allows a user to set colors for foreground, background, and links. Control of the appearance of information on a display can also be manipulated utilizing this display. The Start Page tab 762 allows a user to specify what World Wide Web page should be the first presented to a user when the system is started. The Advanced tab 764 allows a user to specify how many items will be kept in a history folder and how large the cache size should be. The File Types tab 766 allows a user to associate a particular program with a particular file type. For example, if a WordPerfect (WP) file is encountered, WordPerfect™ can be started to allow the file to be properly manipulated by a user. All of these tabs are stored in a file with the values associated with each tab. This file can be manipulated by a program to facilitate interfacing with the standard displays already discussed in accordance with a preferred embodiment of the invention.

Therefore, in the present embodiment, the Internet browser is used as the accessor software. The browser is evoked, preferably in the background, to make a connection to the Internet. Macros are then used to poll appropriate web pages (as selected by the user) and/or retrieve e-mail (and any attachments) addressed to the user. For example, commercial services such as UUNET permit users to have a "virtual" domain name on the internet, such as USER@VIRTUALDOMAINNAME.COM. In this instance, "USER" is the name of the mail recipient, "VIRTUALDOMAINNAME" is the name of the commercial entity (e.g. the company), and "COM" designates that it is a commercial enterprise. Other common suffixes are "EDU" for educational entities, "GOV" for government entities, and "NET" for network entities. The accessor software then retrieves the pertinent information from the Internet e-mail, or the e-mail itself and/or its attachments, and uses that information as described herein.

Figure 8:
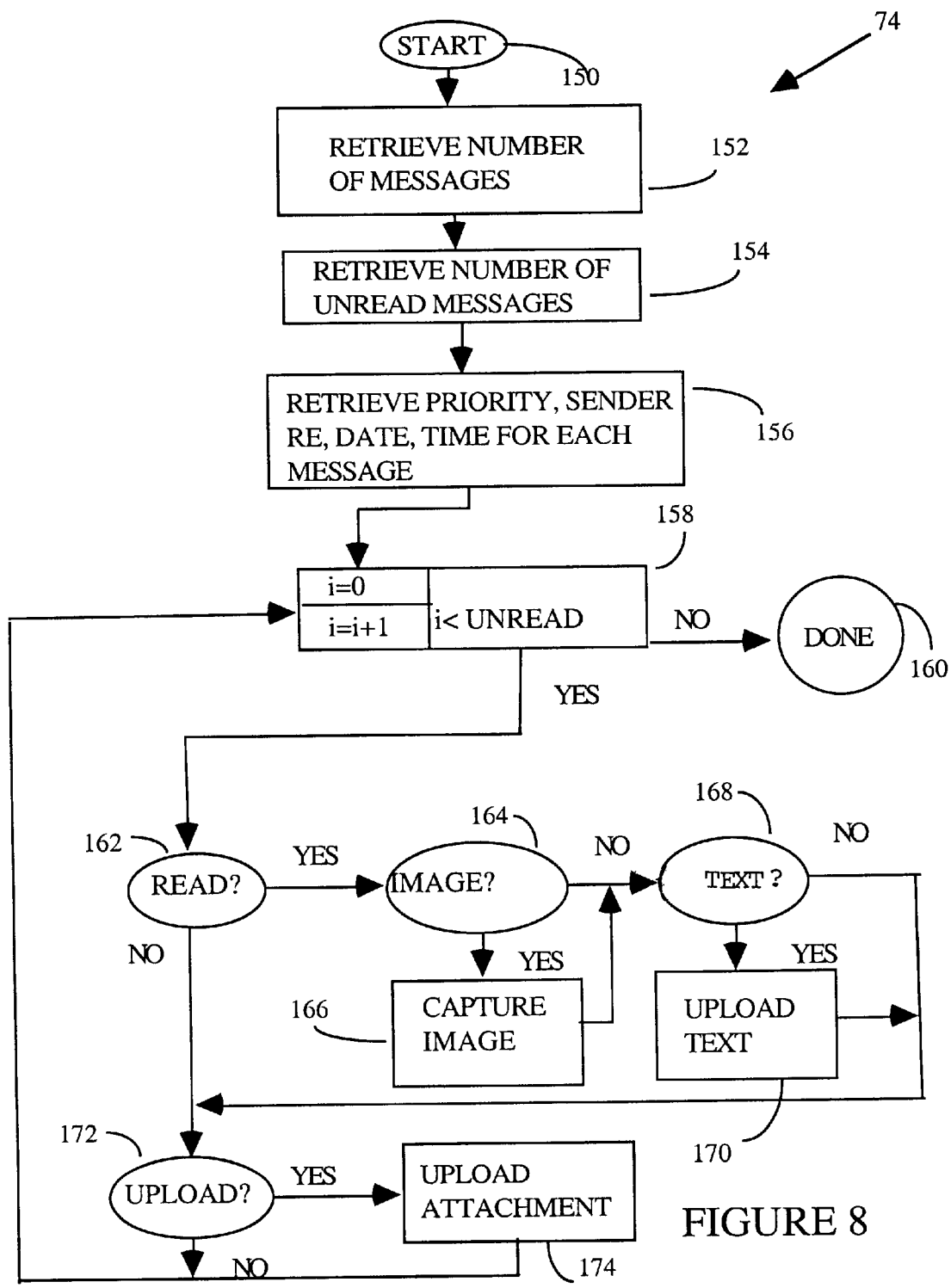
FIG. 8 is a flow-diagram of the "RETRIEVE DATA CONCERNING MAIL FROM E-MAIL SYSTEM" step of FIG. 3.

In FIG. 8, the step 74 "RETRIEVE DATA CONCERNING E-MAIL" of FIG. 3 is illustrated in greater detail. The process 74 begins at 150 and, in a step 152, the number of messages for a given user on a given e-mail system is retrieved. Next, in a step 154, the number of unread messages for the given user on the given e-mail system is retrieved. Next, in a step 156, the priority, sender, Re, date, time for each message is retrieved. However, it should be noted that steps 152–156 can be performed at different orders, or in some instances, essentially simultaneously.

After retrieving information concerning the messages, an iterative loop 158 is entered. The iterative loop uses a counter "i" and loops for the number of unread messages that were determined in step 154. Upon the completion of the iterative loop 158, the process 74 is completed as indicated in step 160. However, if there are still unread messages, a step 162 determines whether the message should be read. This can be determined by the fill-in boxes 100 and 102 of window 94 of FIG. 4b. If the message is to be read, a decision is made in step 164 whether the image should be captured. If so, the image is captured in a step 166. In a step 168, it is determined whether the text should be downloaded. If so, the text is downloaded in a step 170. Process control is then directed to step 172, which determines whether the attachment (if any) for a given message should be downloaded. If "yes", the attachment is downloaded in a step 174. Process control is then returned to iterative loop 158 wherein the counter i is incremented by 1. If there are additional unread messages, iterative loop 158 is traversed again, and if not, the process 74 is completed at step 160 as described previously.

Figure 9:
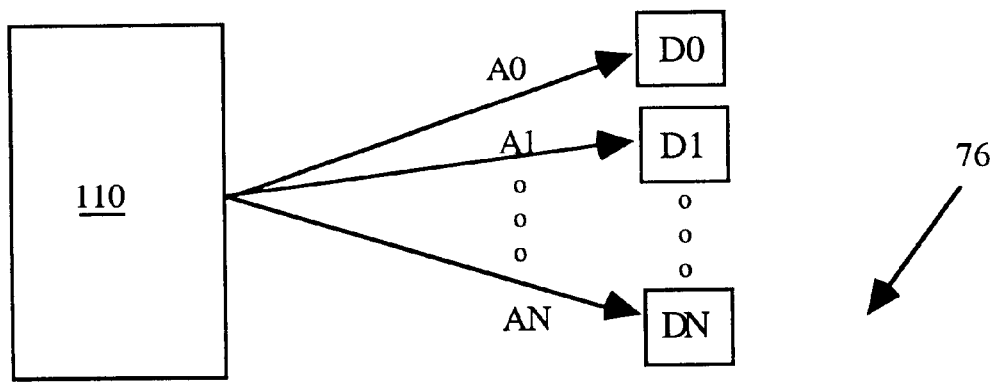
FIG. 9 is a diagram illustrating the "STORE DATA ON USER MACHINE" step of FIG. 3.
Figure 9:
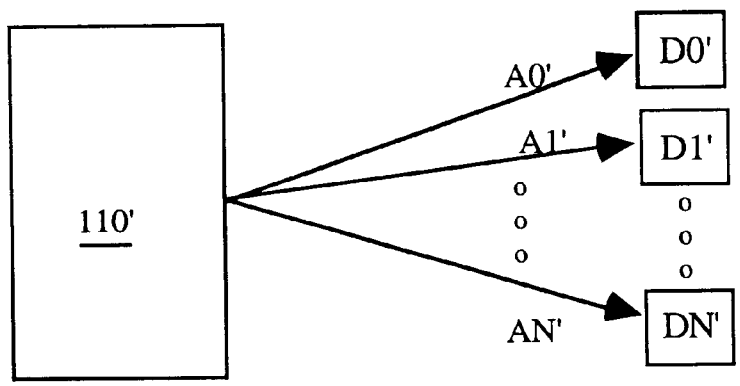
Figure 10A:
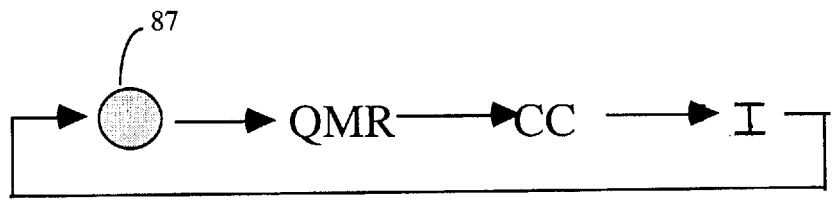
FIGS. 10a, 10b, and 10c illustrate the "DISPLAY DATA CONCERNING A NUMBER OF E-MAIL SYSTEMS" step of FIG. 3.
Figure 10B:
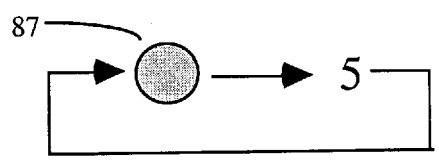
Figure 10C:
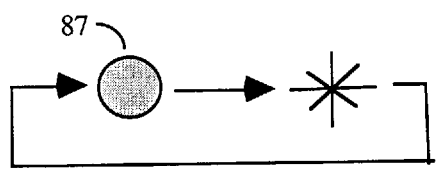

FIG. 9 is used to illustrate the step 76 "STORE DATA ON USER MACHINE" described with reference to FIG. 3. A preferred data structure has already been described with reference to FIG. 5. As previously described, the data structure 110 includes a number of pointers A0, A1, A2, . . . AN which points to various data D0, D1, D2. . . . DN. Data D0, in this instance, is the image of message 0 retrieved from the e-mail system QM Remote. As used herein and "image" of a message refers to data with contains little or no content information, i.e. just data pertaining to the image itself. For example, an image of a message might include only a bitmap of the visual image of the message, without having information concerning the content of the message, such as the ASCII text of the message. Data D1 is the text for the same message. Likewise, a data structure 110' can be for a different remote e-mail system such as the Internet. In this instance, pointers A0' would point to data D0', pointer A1' points to data D1', and pointer AN' points to pointer DN'. The use of pointers allows large data files (such as images) to be placed in slower mass storage while the searchable data structures 110 and 112 can be placed compactly in a faster storage medium, such as RAM 30. In Figures 10a–10c, various aspects of steps 80 of FIG. 3 "DISPLAY DATA CONCERNING A NUMBER OF REMOTE E-MAIL SYSTEMS" are illustrated. With brief reference to FIG. 4a, it will be noted that there is an icon 87 in the upper left hand corner of screen 82. In the case of the Macintosh™ computer system, this icon is the Apple logo for Apple Computer, Inc. A method for displaying the receipt of messages as illustrated in FIG. 10a is to alternatively flash the icon 87 with abbreviations or icons representing a remote e-mail system having unread messages for a designated user. In is instance, the abbreviations "QMR", "CC", and "I" are flashed in succession to indicate that there are messages on Quick Mail Remote, CC mail, and the Internet for the user. For example, the icon 87 can be flashed for one second, the abbreviation "QMR" can be flashed in the place of icon 87 for one second, the abbreviation "CC" can be flashed in the place of the abbreviations QMR for one second, the abbreviation "T" can be flashed in the place of abbreviation CC for one second, and then the icon 87 can replace the abbreviation "I" for one second with the loop repeating until stopped by the user.

In FIG. 10b, a more simplified designator is illustrated. In this instance, the icon 87 and the number 5 are alternatively flashed on the "command bar" 86 of the screen 82. The "command bar" is a visual location on the screen 82 which includes titles of pull-down menus for various system functions. The number "5" indicates that five messages have been received from various e-mail sources. Of course, the number "5" is merely an example, and the actual number of messages received is alternatively flashed with the icon 87.

A still simpler mechanism is illustrated in FIG. 10c. In this instance, the icon 87 is alternatively flashed with an arbitrary symbol, such as the asterisk symbol "*" shown. This merely indicate to users that there is e-mail in the system that is addressed to them from some remote e-mail source.

FIG. 11 illustrates a window 176 that can "pop up" on the screen upon the receipt of data concerning a remote e-mail system. This type of window is typically only used for urgent messages, as indicated by priority display selection 98 of FIG. 4b. In this example, an urgent message is being sent by James Winston concerning a deadline, and the service QM Remote is indicated as the source of the message. The user can then log-in to QM Remote to receive the message or can retrieve the message or image of the message that had already been downloaded, if the download option had been selected.

Figure 12C:
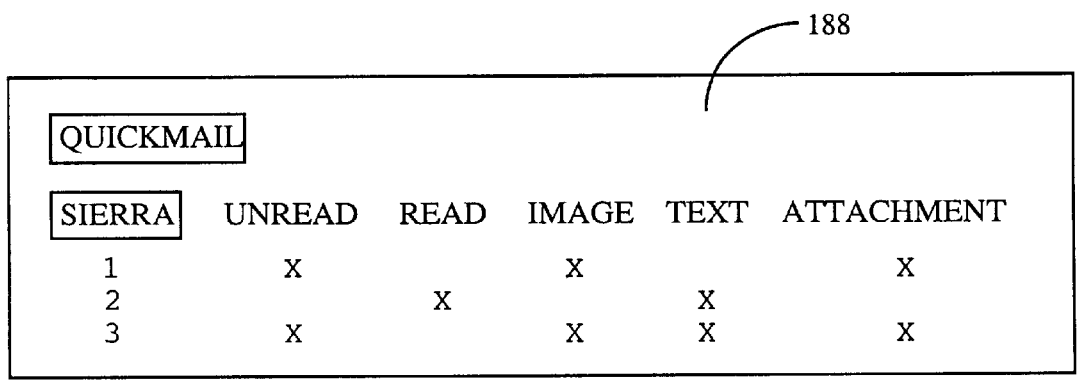

FIGS. 12a–12c illustrate a hierarchy of menus concerning e-mail from a variety of e-mail sources. In FIG. 12a, a window 178 indicates with selection box 180 that mail has been received through Quick Mail, the Internet, and CC Mail. A pointer 182 can be used to select the Quick Mail source, and the number of read and unread messages on Quick Mail for all senders is displayed in a window 184 in FIG. 12b. A pointer 186 can then select a given sender (in this case "Sierra") to create a window 188 which shows all of the Quick Mail messages from Sierra and the status of those messages. In this instance, message 1 is unread, but the image and attachment for the message is stored in local memory, message 2 has been read and the text has been stored in local memory, and message 3 has been unread and the image, text, and attachment has been stored in local memory.

While this invention has been described in terms of several preferred embodiments, it is contemplated that alternatives, modifications, permutations and equivalents thereof will become apparent to those skilled in the art upon a reading of the specification and study of the drawings. It is therefore intended that the following appended claims include all such alternatives, modifications, permutations and equivalents as fall within the true spirit and scope of the present invention.

What is claimed is:

1. A method for monitoring multiple electronic mail systems comprising:

configuring an e-mail system polling process on a user machine for a plurality of e-mail systems, said user machine including a video display, where said configuring includes designating a plurality of e-mail system accessors corresponding to said plurality of e-mail systems and designating an activation schedule for said plurality of e-mail system accessor;

polling said plurality of e-mail systems from said user machine based upon said activation schedule;

retrieving data from said e-mail systems concerning e-mail intended for said user;

storing said data on said user machine in a format that permits the storage of data pertaining to said plurality of e-mail systems; and visually displaying an indication in a consolidated fashion on said video display that there is at least one message from at least one e-mail system for said user when there is at least one message.

2. A method for monitoring multiple electronic mail systems as recited in claim 1 wherein configuring an e-mail system polling process further includes:

for each of said plurality of e-mail system accessors, designating at least one of a plurality of parameters selected from a message retrieval group comprising downloading an image, downloading text, and downloading an attachment from an e-mail system accessed by a respective e-mail system accessor.

3. A method for monitoring multiple electronic mail systems as recited in claim 2, wherein configuring an e-mail system polling process further includes:

designating at least one message display parameter to be displayed on said video display for each of said plurality of e-mail system accessors.

4. A method for monitoring multiple electronic mail systems as recited in claim 1 wherein polling a plurality of e-mail systems from said user machine includes:

detecting a time to initiate a poll for a given e-mail system;

establishing a connection to said e-mail system; and providing an inquiry to said e-mail system to determine the existence of messages for said user.

5. A method for monitoring multiple electronic mail systems as recited in claim 4 wherein establishing a connection includes activating an e-mail system accessor.

6. A method for monitoring multiple electronic mail systems as recited in claim 5 wherein retrieving data includes retrieving data from said e-mail system accessor.

7. A method for monitoring multiple electronic mail systems as recited in claim 4 wherein storing data includes storing an e-mail database structure in a machine-readable media, where said e-mail database structure includes a plurality of mail headers and a message block for each retrieved message, where each message block is linked to a mail header corresponding to the origin of the data stored in said message block.

8. A method for monitoring multiple electronic mail systems as recited in claim 1 wherein polling includes:
   initializing a modem;
   dialing the telephone number of an e-mail system with said modem; and
   communicating with said e-mail system over a telephone connection.

9. A method for monitoring multiple electronic mail systems as recited in claim 1 further comprising visually displaying information on said video display concerning at least one message detected at an e-mail system for said user.

10. An apparatus for monitoring multiple electronic mail systems comprising:
   a digital processor;
   a video display coupled to said digital processor;
   read/write memory coupled to said digital processor;
   at least one external communications channel coupled to said digital processor permitting said digital processor to communicate with a designated plurality of external electronic mail systems;
   a poller at least partially stored in said read/write memory and executable on said digital processor, said poller being operative to initiate inquiries based upon an activation scheme over said at least one communications channel to said designated plurality of electronic mail systems pertaining to a designated user;
   a data retriever at least partially stored in said read/write memory and executable on said digital processor, said data retriever being operative to receive data concerning mail intended for said designated user from said designated plurality of electronic mail systems;
   a database handler at least partially stored in said read/write memory and executable on said digital processor, said database handler being operative to store and retrieve said data concerning mail for said designated user from said designated plurality of electronic mail systems; and
   a displayer at least partially stored in said read/write memory and executable on said digital processor, said displayer being operative to selectively display data stored by said data handler on said video display.

11. An apparatus for monitoring multiple electronic mail systems as recited in claim 10 wherein said at least one external communications channel includes a Local Area Network (LAN).

12. An apparatus for monitoring multiple electronic mail systems as recited in claim 10 wherein said at least one external communications channel includes a modem and a telephone line.

13. An apparatus for monitoring multiple electronic mail systems as recited in claim 10 wherein said at least one external communications channel includes a terminal emulator coupling said digital processor to computer system having a significantly more powerful digital processor.

14. An apparatus for monitoring multiple electronic mail systems as recited in claim 10 further comprising:
   a controller at least partially stored in said read/write memory for selectively controlling said poller, said data retriever, said displayer, and said data handler.

15. An apparatus for monitoring multiple electronic mail systems as recited in claim 14 further comprising an inputter at least partially stored in said read/write memory to provide user inputs to said controller.

16. An article of manufacture for monitoring multiple electronic mail systems comprising:
   a machine-readable storage medium;
   a poller stored in said storage medium and including program instructions to initiate inquiries over at least one communications channel to a designated plurality of electronic mail systems based upon an activation scheme;
   a data retriever stored in said storage medium and including program instructions to receive data concerning mail intended for a designated user from said designated plurality of electronic mail systems;
   a data handler stored in said storage medium and including program instructions to store and retrieve said data concerning mail for said designated user from said designated plurality of electronic mail systems; and
   a displayer stored in said storage medium and including program instructions to selectively display data stored by said data handler on a video display.

17. An article of manufacture as recited in claim 16 further comprising:
   a controller stored in said storage medium for selectively controlling said poller, said data retriever, said displayer, and said data handler.

18. An article of manufacture as recited in claim 17 further comprising an inputter stored in said storage medium to provide user inputs to said controller.

19. An e-mail database structure stored in a machine-readable memory comprising:
   a plurality of mail headers corresponding to a plurality of e-mail systems that are being monitored for messages for a designated user; and
   a message block corresponding to each detected message for said designated user from said plurality of e-mail systems, wherein each message block is linked with an e-mail header of said plurality of e-mail headers corresponding to the e-mail system from which it was derived.

20. An e-mail database structure as recited in claim 19 wherein each of said plurality of mail headers includes information concerning the number of messages with which it is linked.

21. An e-mail database structure as recited in claim 20 wherein each of said message blocks includes a message identification code associated with said message block and its mail header, and wherein each of said message blocks includes information concerning said a message for said designated user and pointers to data reflecting a content of said message.

22. A machine readable media containing machine executable instructions to implement a process that monitors multiple electronic mail systems, the process comprising: configuring an e-mail system polling proves an a user machine for a plurality of e-mail system, said user machine including a video display, where said configuring includes designating a plurality of e-mail system accessors corresponding to said plurality of e-mail systems designating an activation schedule for said plurality of e-mail system accessors; polling said plurality of e-mail systems from said user machine based upon said activation schedule; retrieving data from said e-mail systems concerning e-mail intended for said user; storing said data on said user machine in format that permits the storage of data pertaining to said plurality of e-mail systems; and visually displaying an indication in a consolidated fashion on said video display that there is at least one message from at least one e-mail system for said user when there is at least one message.

* * * * *